United States Patent [19]

Posseme

[11] Patent Number: 4,774,766
[45] Date of Patent: Oct. 4, 1988

[54] WEAKLY MAGNETIC COMPASS
[75] Inventor: Gilles Posseme, Brest, France
[73] Assignee: Thomson-CSF, Paris, France
[21] Appl. No.: 48,730
[22] Filed: May 11, 1987
[30] Foreign Application Priority Data May 13, 1986 [FR] France .................. 86 06858

[51] Int. Cl.$^4$ ............................................. G01C 17/30
[52] U.S. Cl. .................................................... 33/361
[58] Field of Search .................................. 33/349, 361

[56] References Cited

U.S. PATENT DOCUMENTS

| | | | |
|---|---|---|---|
| 3,355,705 | 11/1967 | Koerner | 33/349 |
| 3,802,088 | 4/1974 | Barrett et al. | 33/349 |
| 3,853,089 | 12/1974 | Howard | 33/349 |
| 3,888,201 | 6/1975 | Zuvela | 33/361 |
| 4,037,328 | 7/1977 | Kuehn et al. | 33/349 |
| 4,104,803 | 8/1978 | Hoeppel | 33/361 |
| 4,255,866 | 3/1981 | Sears | 33/361 |
| 4,503,621 | 3/1985 | Fowler | 33/361 |

FOREIGN PATENT DOCUMENTS

| | | | |
|---|---|---|---|
| 1310302 | 3/1971 | United Kingdom | 33/361 |
| 2107057 | 4/1983 | United Kingdom | |

*Primary Examiner*—Harry N. Haroian
*Attorney, Agent, or Firm*—Oblon, Fisher, Spivak, McClelland & Maier

[57] ABSTRACT

A compass, by which under-water divers can find their direction, comprise two crossed flux-gate type magnetometers, the measurements of which are processed by logic signals to light up a set of light-emitting diodes which indicate the right direction and, if necessary, the direction and approximate value of the offset of the compass. By using non-magnetic materials and low-consumption electronics, the disturbance of the local field is considerably reduced as compared with a conventional compass. This enables divers to avoid triggering magnetically fired mines.

7 Claims, 4 Drawing Sheets

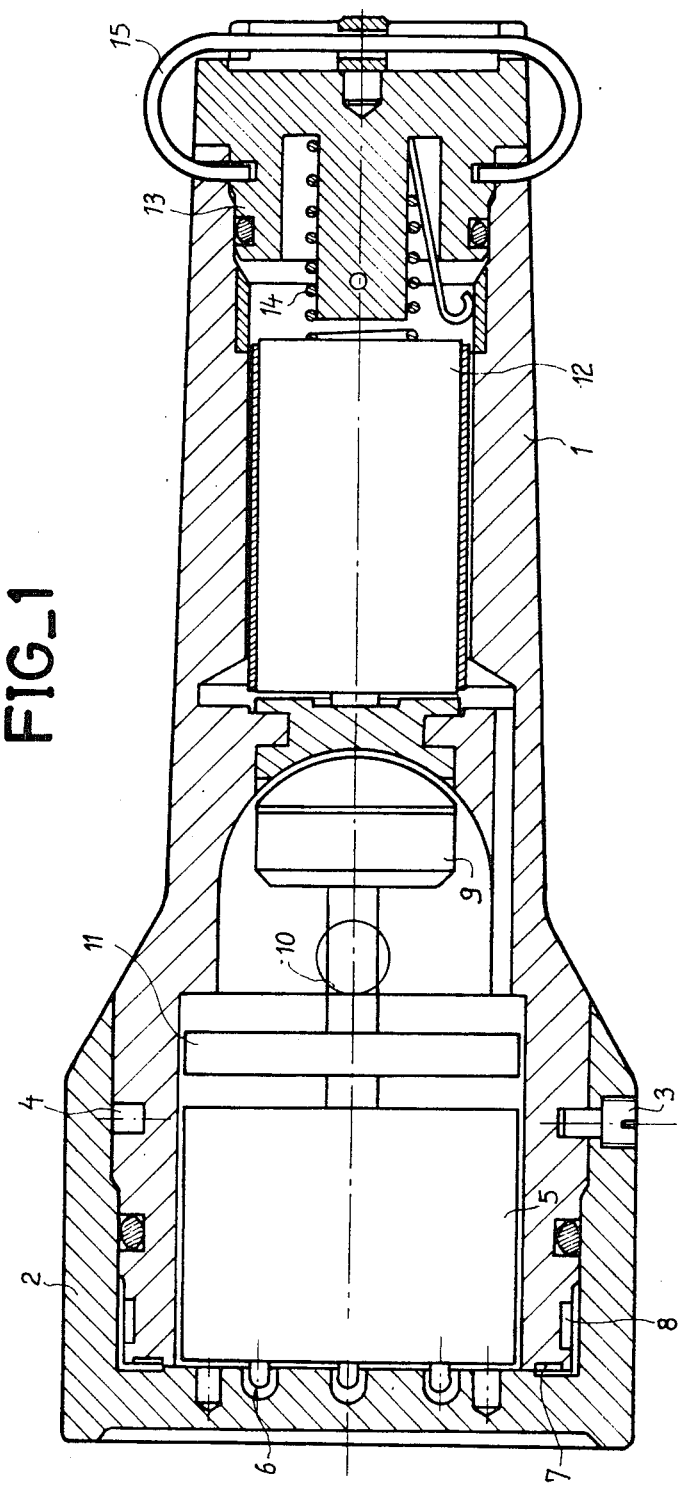
FIG_1

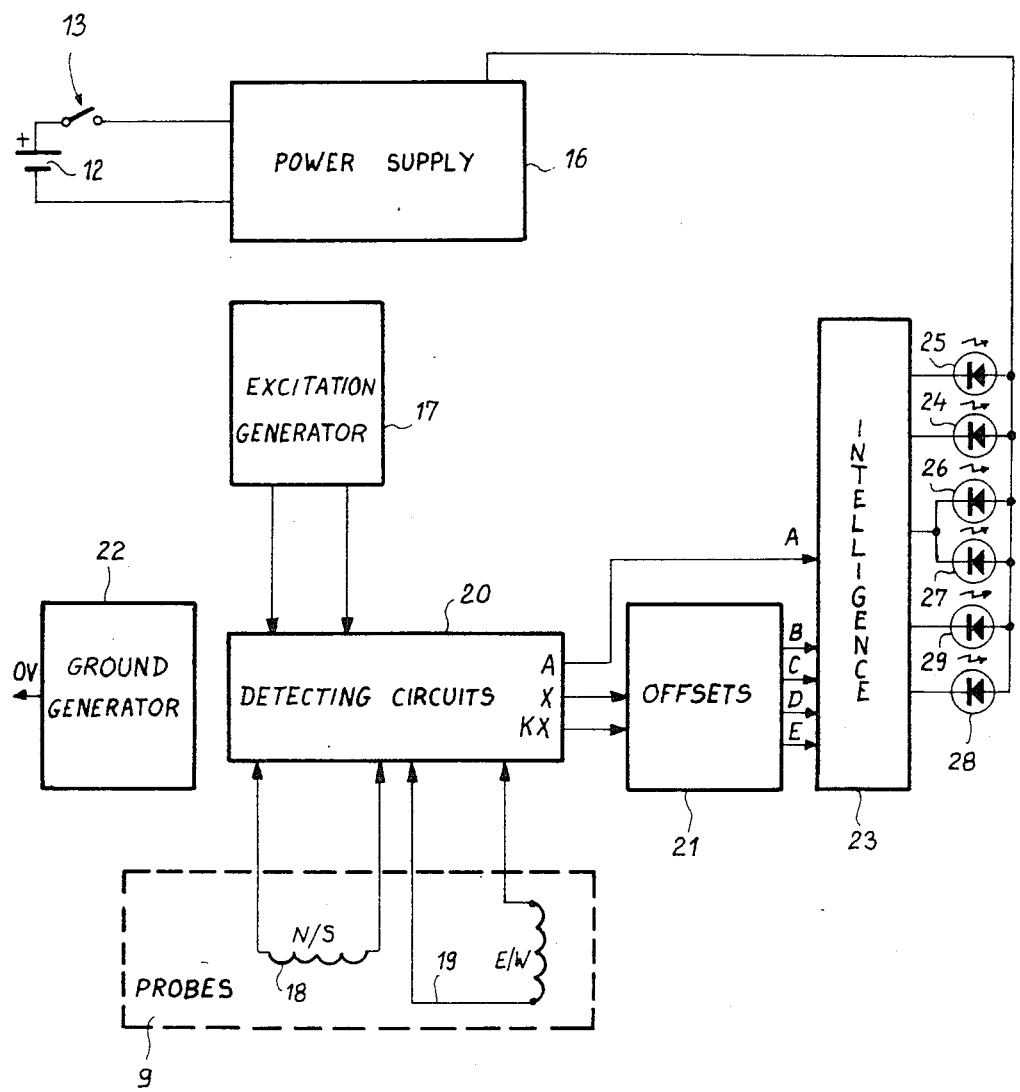

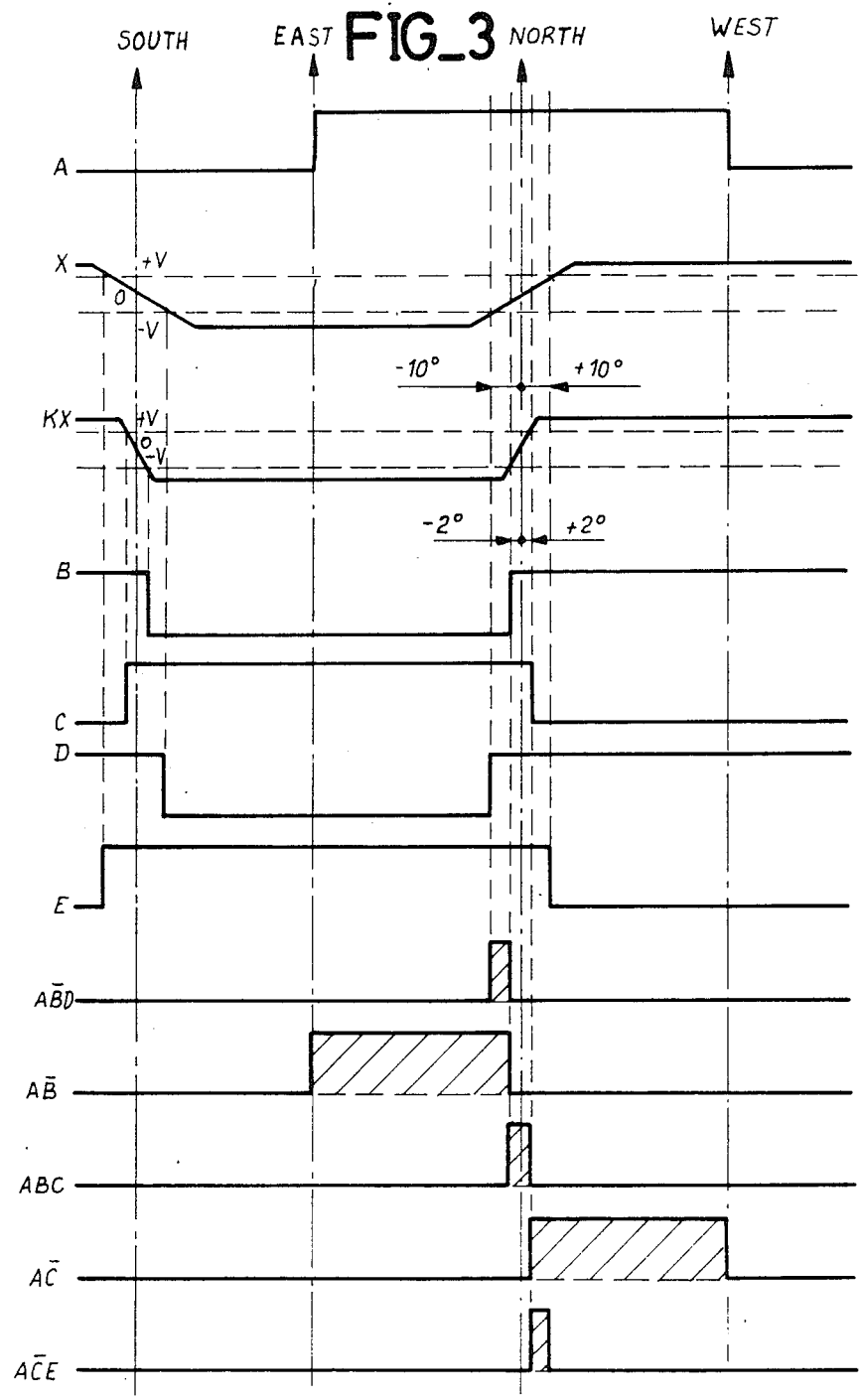

FIG_4
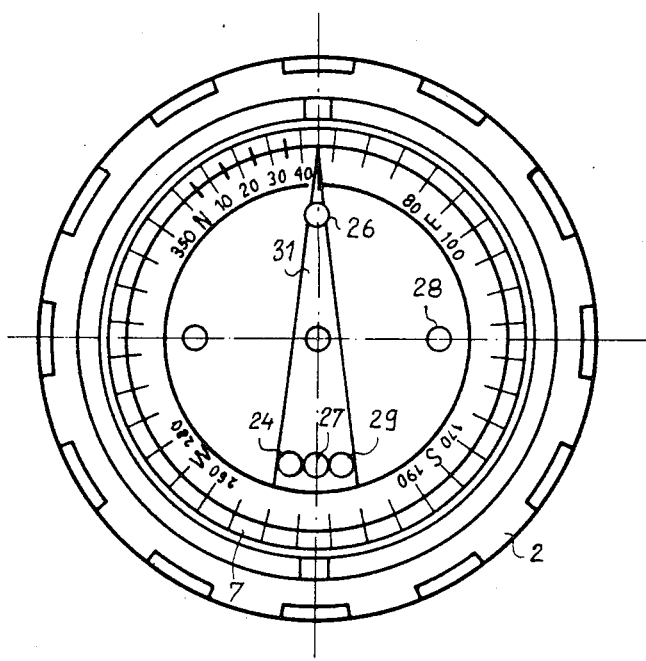

WEAKLY MAGNETIC COMPASS

BACKGROUND OF THE INVENTION

The present invention pertains to compasses which can be used to find a direction with reference to the magnetic North while at the same time causing as little disturbance as possible in the local magnetic field in the vicinity of this compass.

In the prior art, a direction is determined with reference to the magnetic North by using a conventional type of compass comprising a little magnet mounted on a needle. A graduated dial known as a compass card, fixed to the magnet, is used to find the chosen direction according to the graduations on it.

Although the level of disturbance that an instrument of this type causes in the local magnetic field is low, it is nevertheless troublesome in certain cases. Thus, such disturbance is quite capable of actuating the triggering device of a magnetic mine. Now undersea divers have to use compasses of this type to guide themselves under water, and they therefore run the risk of accidentally triggering magnetic mines of this type, especially when they are engaged in mine-clearing operations.

There are also terrestrial magnetic compasses in the prior art, known as flux gates, comprising a probe fitted with a saturable core located within an exciting coil. The Earth's continuous magnetic field, superimposed on the excitation field induced by the coil, causes an imbalance in the electrical current produced by this excitation field. The measurement of this imbalance can be used to determine the orientation and value of the Earth's continuous magnetic field.

SUMMARY OF THE INVENTION

The invention is based on the unexpected discovery that the disturbance of the local field, created by a magnetometer of this type, is far weaker than the disturbance created by the magnet of a compass. If all ferromagnetic materials were to be eliminated from the construction of this magnetometer (except for the cores for the probes), and if low-consumption electrical circuits were used, it would be easy to achieve a level of disturbance which would be 100 to 1000 times weaker than that produced by a conventional magnetic compass bearing a small magnet.

The compass according to the invention thus comprises at least one flux-gate type of magnetometer and low-consumption electronic circuits which are used to power this magnetometer and which, depending on the indications given by it, light up indicators pointing to the desired direction.

BRIEF DESCRIPTION OF THE DRAWINGS

Other specific features and advantages of the invention will appear more clearly from the following description, made with reference to the appended figures, of which:

FIG. 1 is a section view of a compass according to the invention;

FIG. 2 is a diagram of the electronic circuit of this compass;

FIG. 3 is a graph of the signals in these electronic circuits;

FIG. 4 is a view of the indicator dial forming the compass card of the said compass.

DESCRIPTION OF THE PREFERRED EMBODIMENT

The compass depicted in a partial section view in FIG. 1 comprises a body 1, the external shape of which is fairly similar to that of an electric torch. A movable ring 2 is fixed to the tip of this body while remaining joined to it by means of a screw 3 which is housed in a circular groove 4. In its rotation, this ring drives an electronic unit 5 placed in the hollow interior of the body 1. This unit powers light indicators, such as 6, which can be seen through the upper surface of the ring. For this, this ring is made of a transparent material through which, therefore, it is possible to see the light indicators as well as two compass cards, one upper card 7 and the other side card 8 which are engraved on the body 1. Pointers not shown in FIG. 1 identify the position of the ring with reference to the compass cards.

A pendulum 9, comprising the lower hemispherical ballast, is located in the internal cavity of the body 1. The bottom of this cavity also has a hemispherical shape, so that the pendulum slides in it with a light friction which is softened, if necessary, but a viscous liquid. A cardan joint 10 enables this pendulum to oscillate so that it remains vertical when the direction of the longitudinal axis of the compass body deviates from the local vertical line, at least within certain limits. It is therefore enough for the diver to maintain the compass roughly with its tip upwards for the pendulum to stay vertical. The cardan joint 10 connects the pendulum to the body, therefore enabling these oscillations while at the same time preventing a rotational movement of the pendulum, with respect to the body, along the longitudinal axis of the body.

The pendulum has two magnetometer probes of the flux-gate type at its upper part, arranged in quadradure with respect to one another and perpendicularly to the longitudinal axis of the body when this body is in the same axis as the axis of the pendulum. The action of the pendulum thus maintains these two probes in a horizontal plane despite the movement of the compass, and does so within the limits specified above.

A rotating joint 11 powers the pendulum-borne probes from electronic circuits 5, regardless of the rotation of the ring 2 with respect to the body 1. The power supply conductors are, for example, flexible wires which go through the cardan joint 10 without limiting the clearance of the pendulum.

The lower end of the body is also hollow, and contains a battery 12 which has the task of powering the electronic circuits 5 through conductors, not depicted in the figure, which end at the rotating joint 11. This battery is held in position by a rotating plug 13 which closes the lower end of the body and acts as a switch for starting up the compass. This rotating switch comprises, in a known way, a certain number of parts such as the springs 14 and 15 for which which care has been taken, as with all the other parts of the instrument, to make them of non-ferromagnetic material, such as plastic and phosphor bronze for the springs for example.

The electronic circuits comprise a certain number of modules, as shown in FIG. 2.

A power supply 16 with chopping is used, from the battery 12 and through the switch plug 13, to supply the different power voltages needed by the electronic circuits. The power supply connections are not shown in the figure.

An excitation current generator, essentially comprising an oscillator, provides the alternating electrical current needed to power the two probes, namely the North-South probe 18 and the East-West probe 19, borne by the pendulum 9.

This alternating current is supplied through a magnetic detection circuit 20 which can be used, according to a known technique, to detect the disymmetry introduced by the Earth's magnetic field into the currents flowing through the probes and to deliver signals measuring this disymmetry.

To minimize the consumption of current, which adversely affects the lifetime of the battery and, above all, causes a disturbance of the local magnetic field by electromagnetic induction, a logic processing system is used.

For this, the signals of the North-South probe are detected in an open loop so that the output voltage can only take two levels, the upper level where it is directed in the northern semi-dial and the lower level when it is oriented in the southern semi dial. The transition between these levels takes place at the passage through the east-west direction. Thus a binary logic signal A is obtained, shown in line 1 of FIG. 3.

By contrast, the signals of the east-west probe are processed in a closed loop, according to a technique which is also known. For this, a counter-reaction system makes a direct current flow in the exciting coil, and this current creates a field which is itself direct and which tends to cancel the effect of the Earth's field. This device, which works according to a method of 0, delivers an output voltage X, the variations of which are shown in the second line of FIG. 3. The system is fairly quickly saturated as soon as the measured field exceeds a certain value and hence, in two fairly large zones surrounding the east-west direction, the voltage is stabilized at a high lever or a low level depending on the direction of the probe within these two zones. When these zones are left, the voltage varies to a degree that is substantially proportionate to the direction, passing by 0 for a North-South direction. An amplifier is used to multiply this voltage X by a coefficient K greater than 1, so a to enlarge the saturation zones and, above all, to obtain a steeper slope in the variation of the signal around the North-South direction. This signal KX is shown in the third line of FIG. 3.

These signals K and X are applied to threshold detection circuits 21 which are used to obtain binary logic signals B,C,D and E which flip between a high level and a low level when the signals X and KX cross $+V$ and $-V$ voltage levels. These voltage levels are identified with reference to a fictitious ground 0, obtained by means of a generator 22 which determines a fictitious ground located at the half value of the power voltage given by the power supply 16. These $+V$ and $-V$ voltages are determined in such a way that the detectors flip over for the signal S when the East-West probe is pointed off the North-South direction by $+$ or $-10°$. The multiplier coefficient K is chosen so that the signal KX crosses these $+V$ and $-V$ voltage limits for offsets of $+2°$ or $-2°$.

The signals V, C, D and E, corresponding to offsets of $-2°$, $+2°$, $-10°$, and $+10°$ are shown in the lines 4 to 7 of FIG. 3.

These logic signals A to E are then applied to a set of logic circuits 23 which perform the following combinations, shown in the lines 8 to 12 of FIG. 3:

A$\bar{B}$D, which is a high level for an offset ranging from $-10°$ to $-2°$;

A$\bar{B}$ which is a high level for an offset ranging from $-90°$ to $-2°$;

ABC which is a high level for an offset ranging from $-2°$ to $+2°$;

ACE which is a high level for an offset ranging from $+2°$ to $+10°$.

It will be noted that this offset is identified with respect to the North-South direction of the so-called East-West coil, with the so-called North-South coil then being in the East-West direction. This convention is used so that, in the determined direction, there is a minimum signal in the coils to obtain a maximum level of sensitivity.

The logic circuits 23 are used to power a set of light-emitting diodes 24 to 28 which light up when the output signals of these circuits are at a high level, and are used to indicate the direction and approximate value of the offset as well as the correct pointing direction.

These light-emitting diodes are seen in FIG. 4 through the transparency of ring 2 which also let the compass card 7 be seen.

The colors of the diodes are given by way of example. They are more especially adapted to indicate the direction to the followed ergonomically by the user.

The ring 2 has an engraved arrow-shaped direction needle 31 which thus rotates at the same time as the ring, the tip of which can be brought to that graduation of the compass card which represents, for example, the path to be followed.

Thus, if the needle is pointed in the chosen direction with an error of no more than $+$ or $-2°$, the yellow diodes 26 and 27, located at the two ends of the needle 31, will light up indicating which direction is the right one.

As soon as the offset goes beyond this limits of 2°, the two yellow diodes 26 and 27 go out and the green diodes 24 and 25, respectively powered by the signals A$\bar{B}$D and A$\bar{B}$ or the red diodes 29 and 28, respectively powered by the signals A$\bar{C}$B and A$\bar{C}$ light up, indicating that there is an offset from the selected route to the right or to the left respectively.

For the diodes 24 and 29 are located to the right and to the left of the diode 27 at the base of the needle 31, and the diodes 25 and 28 are located on the diameter of the ring, perpendicular to the direction of the needle, at the level of the compass card.

As long as the offset ranges between 2° and 10°, both these red diodes or both these green diodes remain lit up.

If the offset is increased, the diode 24 or 27 which is lit up goes out when the said offset goes beyond 10°, leaving only the diode 25 or 28 lit up.

The arrangements and colors of these diodes are such that they easily indicate the change in direction to be taken to correct the offset.

Thus, when the red diodes light up, a left-hand turn must be made and when the green diodes light up, a right-hand turn must be made.

Hence, in correcting the direction, the following are seen in succession: the second offset diode lights up, then the two offset diodes go out and finally, the two diodes showing the right direction light up.

As in any compass, this one can be used in two distinct modes, either to follow a given direction by displaying this direction on the compass card and keeping the diodes 26 and 27 lit up, or to identity the azimuth of a visible target by pointing towards it with the needle and turning the body of the compass until these same two diodes are lit up.

By making a compass of this type with non-magnetic materials, it was possible to reduce the consumption of the electronic circuits to 85 mW and to obtain a disturbance of the local plane that was 100 to 1000 times less than with an ordinary magnetic compass.

The disturbance is so low that it is hard to measure, and this point explains the wide range between these FIGS. 100 and 1000.

What is claimed is

1. A weakly magnetic compass, especially for underwater divers, comprising: an elongated and hollow body, designed to be held in a substantially vertical position by hand and provided with at least one compass card at one end, a transparent, rotating cap for capping said one end, it being possible to see the compass card through the said cap, a pendulum located in the hollow of the body, mounted on a cardan joint, comprising two crossed magnetometers of the flux-gate type, the pendulum making it possible to maintain said magnetometers in a substantially horizontal position despite the movement of the body, an electronic unit located in the hollow of the body to power the magnetometers and a set of light-emitting diodes fixed to said cap and powered by said electronic unit to indicate the direction to be followed depending on the direction of the cap and the body; said cap being made entirely of non-magnetic materials with said electronic units having circuits functioning at a relatively reduced level of power.

2. Compass according to the claim 1, wherein said electronic unit includes means connected to one of said magnetometers to operate said one magnetometer in an open loop to deliver a binary logic signal with two distinct states depending on the direction of the magnetometer, with the flipping-over from one state to another occurring at the passage through the East-West direction, and wherein said electronic unit further includes a means connected to the other magnetometer to operate said other magnetometer in a closed loop to deliver a first signal X which varies in a substantially linear way depending on the offset of said other magnetometer around the East-West direction in passing from a first saturation level to a second saturation level.

3. Compass according to the claim 2, wherein said electronic unit further includes a means for processing a signal KX received from said second magnetometer, where K is a multiplier factor greater than I, said signal being similar to the signal X but having a steeper slope in its zone of variation between two saturation levels.

4. Compass according to the claim 3, wherein said unit further comprises a threshold detection device with at least one of the signals X and KX being applied to said threshold detection device which compares it with two voltage thresholds between the voltage levels and which delivers binary logic signals which change their state when said thresholds are crossed by the signal X or KX, the value of said thresholds being fixed to correspond to determined offset of the direction thus indicated by the compass with respect to the chosen value.

5. Compass according to the claim 4, wherein said electronic unit further comprises a logic unit with the binary logic signals being applied to said logic unit which combines them to deliver the command signals of the said light-emitting diodes.

6. Compass according to the claim 5, wherein the ring comprises an engraved, arrow-shaped needle, the tip of which sweeps through the graduation of the compass card, with a first diode being fixed at the tip of the arrow and a second diode being fixed at the base of the arrow, this first and second diode being lit up simultaneously when the arrow is in the chosen direction within a determined first zone, a third and a fourth diode being fixed at the base of the arrow on either side of the second diode, this third and fourth diode lighting up when the arrow is deflected towards the outside of the first zone while remaining within a second determined zone, the direction of the offset being determined by the lighting up of only one of these diodes at a time, a fifth and sixth diode being fixed at the level of the compass card on a diameter which is perpendicular to the arrow, the third, fourth, fifth and sixth diodes lighting up when the offset is beyond the second determined zone, with only two of these diodes located on the same side of the arrow being lit up simultaneously to indicate the direction of the offset.

7. Compass according to the claim 6, wherein the first zone covers + or −2° and the second zone + or −10°.

* * * * *